United States Patent
Böhm et al.

(10) Patent No.: US 6,626,271 B1
(45) Date of Patent: Sep. 30, 2003

(54) ELECTRICALLY CONTROLLED BRAKING SYSTEM AND ASSOCIATED CONTROL METHOD

(75) Inventors: Jürgen Böhm, Oberneisen (DE); Stefan Stölzl, Weinheim (DE); Joachim Nell, Hanau (DE); Tomasz Augustyniak, Darmstadt (DE); Rainer Oehler, Darmstadt (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/719,922

(22) PCT Filed: Jun. 15, 1999

(86) PCT No.: PCT/EP99/04133

§ 371 (c)(1),
(2), (4) Date: Apr. 12, 2001

(87) PCT Pub. No.: WO99/65746

PCT Pub. Date: Dec. 23, 1999

(30) Foreign Application Priority Data

Jun. 16, 1998 (DE) .......................... 198 26 687

(51) Int. Cl.[7] .............. B60L 7/00; B60T 8/88; B60T 13/66
(52) U.S. Cl. .......................... 188/158; 303/20; 303/122; 303/13
(58) Field of Search .............. 303/122, 122.08, 303/122.03, 122.04, 122.05, 122.11, 20, 2, 3, 4, 9, 122.09, 122.1, 122.13, 122.14, 13; 188/158

(56) References Cited

U.S. PATENT DOCUMENTS

| | | | |
|---|---|---|---|
| 3,838,888 A | | 10/1974 | Gynn |
| 4,629,043 A | * | 12/1986 | Matsuo et al. .............. 188/2 D |
| 5,139,315 A | * | 8/1992 | Walenty et al. ............... 303/20 |
| 5,499,866 A | * | 3/1996 | Brugger et al. ............... 303/20 |
| 5,957,246 A | * | 9/1999 | Suzuki ........................ 303/20 |
| 6,139,117 A | * | 10/2000 | Shirai et al. .................. 303/20 |
| 6,183,051 B1 | * | 2/2001 | Hill et al. ..................... 303/20 |
| 6,227,626 B1 | * | 5/2001 | Blattert ........................ 303/20 |
| 6,293,363 B1 | * | 9/2001 | Ranaswamy et al. ....... 188/158 |
| 6,360,157 B1 | * | 3/2002 | Hartmann .................... 188/158 |

FOREIGN PATENT DOCUMENTS

| | | |
|---|---|---|
| DE | 34 10 006 | 9/1985 |
| DE | 34 44 301 | 6/1986 |
| DE | 35 18 715 | 11/1986 |
| DE | 40 04 149 | 8/1991 |
| DE | 40 29 333 | 3/1992 |
| DE | 195 48 392 | 7/1997 |
| DE | WO-98/12090 A1 * | 3/1998 |

OTHER PUBLICATIONS

Search Report of the German Patent Office for Application No. 198 26 687.1.

* cited by examiner

*Primary Examiner*—Jack Lavinder
*Assistant Examiner*—Thomas J. Williams
(74) *Attorney, Agent, or Firm*—Rader, Fishman & Grauer PLLC

(57) ABSTRACT

The present invention relates to an electrically operable brake system and a method for its actuation. The brake system and the method are characterized in that the service brake system can be activated by two brake operating devices which are operable by the driver independently of each other. The main advantage which results is that upon failure of a brake operating device which is e.g. configured as a brake pedal module, braking of the vehicle can be achieved by means of the service brake system by way of the second brake operating device. The additional functions intended for the service brake system, such as ABS, TCS, driving dynamics control, brake assist system, etc., may then be implemented, if so desired. The redundant design of the actuation for the service brake permits achieving a high degree of operational safety because full braking functions can be maintained even in case of emergency braking.

20 Claims, 3 Drawing Sheets

ELECTRICALLY CONTROLLED BRAKING SYSTEM AND ASSOCIATED CONTROL METHOD

TECHNICAL FIELD

The present invention generally relates to vehicle brakes and more particularly relates to an electrically operable brake system for automotive vehicles and a method for its actuation.

BACKGROUND OF THE INVENTION

Automotive vehicles are typically equipped with a service brake system that is operable by a brake pedal and a parking brake system that is operable by a hand lever or a foot pedal. While the parking brake system is normally used to prevent a waiting or parked vehicle from rolling away, the objective of the service brake system is to reduce the speed of a vehicle during normal operation or to bring the vehicle to halt.

Modern service brake systems are frequently equipped with additional systems such as ABS, TCS, driving dynamics control systems, brake assist systems, and similar systems to improve the reliability in operation. Most recently, electrically operable brake systems for automotive vehicles have become known where the application of a brake pedal is sensed by a sensor device and converted into corresponding input signals for a control unit for the actuation of the service brake system. One disadvantage a control concept of such a type suffers from is, however, that upon failure of the sensor device which senses the brake pedal application, the service brake system fails as well and braking can be achieved only by way of the parking brake system which usually acts upon the rear axle. However, especially in braking a vehicle at higher speed which is effected by the parking brake system alone, the corresponding wheel brakes of the parking brake system are exposed to major load what can lead to considerable wear of the wheel brakes. Because the additional systems such as ABS, brake assist system, etc., do not act on conventional parking brake systems, the rear wheels may even lock, whereby driving stability can be impaired and the vehicle may go into a spin.

An object of the present invention is to provide an electrically operable brake system for automotive vehicles and a method for its actuation permitting an increased reliability and an improved operational safety.

In a particularly simple embodiment of the present invention, the additional brake operating device may be achieved e.g. by means of a manually operable switch which is mounted in the instrument panel, on the steering wheel, or any other appropriate location and is actuated by the driver in case of need. By actuating the switch which is normally envisaged for a case of emergency a corresponding brake signal can be sent to a control unit of the service brake system which, subsequently, presets an invariably adjusted nominal brake value, for example, in the way of deceleration, brake torque, tensioning force, etc. In this case, the hazard warning signal system could also be activated because this switch is mainly intended for emergencies. The brake operation can be discontinued by new actuation of the switch.

However, the control unit of the service brake system may also be designed so that when the switch is actuated, instead of a fixed nominal brake value or a fixed brake deceleration, a nominal brake value or a brake deceleration which increases continuously with the duration of the actuation is adjusted until a defined maximum value is reached. An increase of this type may be linear or progressive, for example.

It is also possible though that the deceleration or speed reduction is adjusted in response to the vehicle speed when the switch is actuated. The higher the vehicle speed, the more intense the braking intervention of the service brake system becomes.

In a particularly expedient embodiment of the present invention, the second brake operating device may also be a sensor unit with a plurality of sensors which have a preferably redundant and diverse configuration, by which e.g. the adjustment travel and the actuating force of a second brake operating element is sensed, which is configured as a lever, pedal, push button, or a like element. This permits predefining a brake signal to the control unit that is variable by the driver, which brake signal is processed in the control unit and converted into corresponding nominal brake values for the application of the wheel brakes. A controlled actuation of the service brake system may thus be achieved by way of the second brake operating element as well.

In another favorable embodiment, the second brake operating element may be adapted to the ergonomics of the hand and may comprise an active element which permits simulation of a feedback of the brake operation in the sense of a rising resistance force when the brake value increases. This imparts a feeling for the brake operation to the driver, which contributes to enhancing the operating comfort.

Under safety aspects, the mode of operation of the two brake operating devices is examined by a monitoring device which preferably has a redundant design, and an acoustic and/or visual alarm device can be activated, for example, upon detection of malfunction of a first brake operating device which is designed as a brake pedal simulator. This permits indicating to the driver that the foot operation of the service brake no longer functions and that the service brake must be activated by the e.g. manually operable second brake operating device.

In another especially appropriate embodiment of the present invention, it is also possible to use brake signals which are predetermined by a parking brake operating device for the actuation of a service brake system. In this arrangement, for example, the sensors and/or switches for sensing the operation of an electrically operable parking brake can be used, with the result of reduced costs. However, this case necessitates corresponding provisions for an allocation of the actuation of a parking brake operating element to the activation of the service brake system and/or parking brake system. A suitable allocation may be realized e.g. by way of the vehicle speed in such a manner that the service brake system is activated above a predetermined vehicle speed and the parking brake system is activated below the predetermined vehicle speed by actuation of the parking brake operating element. The result is that braking with the aid of the service brake system can be initiated by way of actuating the parking brake operating device even in case of failure of a service brake operating device which is e.g. configured as a brake pedal module. Intervention of the additional functions of the service brake system such as ABS, ESP, driving dynamics control, and like systems, may also take place. Further, it is ensured that the parking brake system will not be employed at higher vehicle speeds and stressed excessively thereby. It is nevertheless ensured that the driver can park his/her vehicle safely in standstill by means of the parking brake. Further special features and advantages of the present invention can be taken from the following description of advantageous embodiments by way of the accompanying drawings.

DETAILED DESCRIPTION OF THE PREFERRED EMBODIMENTS

Figure 1:
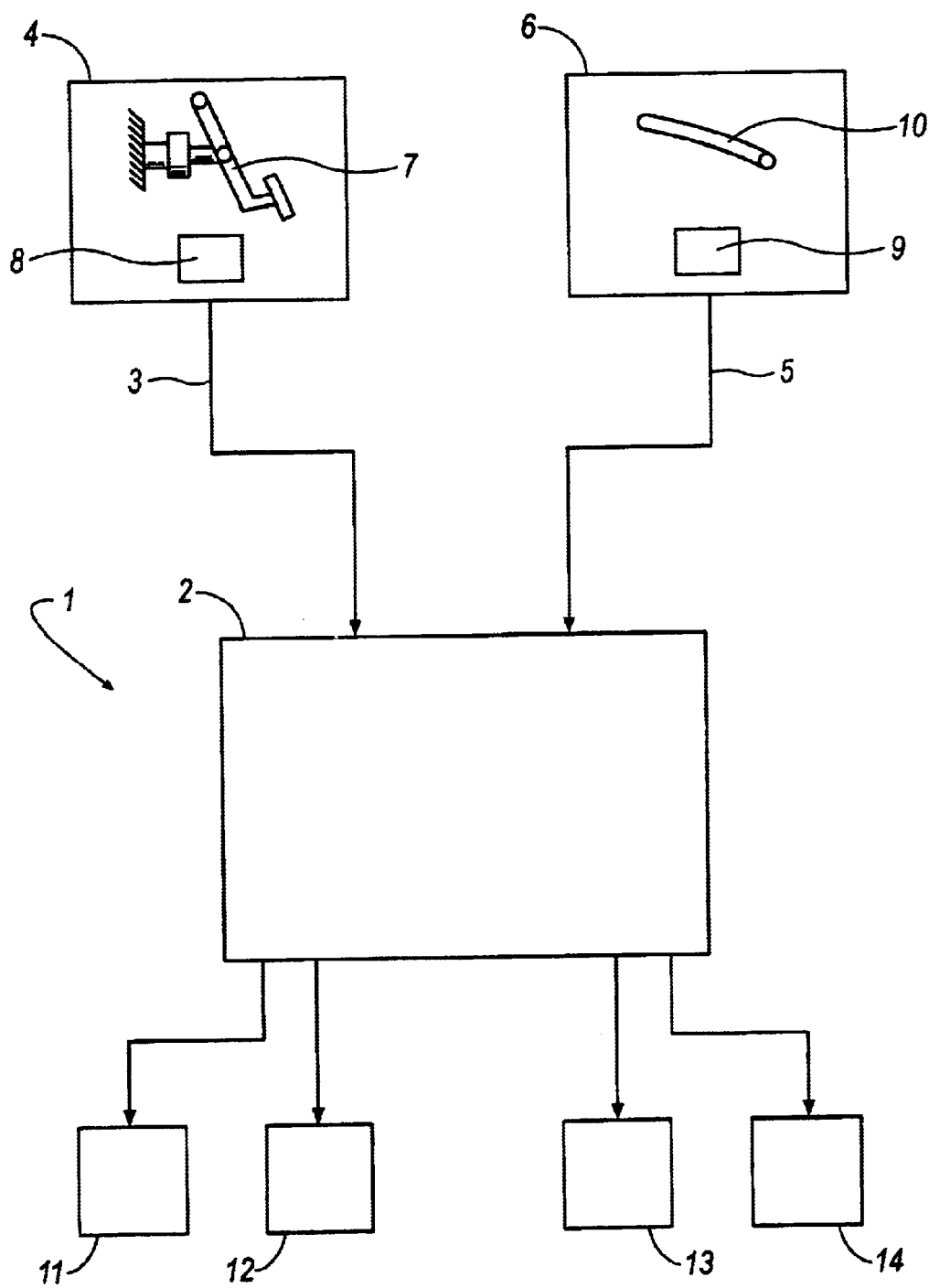
FIG. 1 is a schematic block diagram of a brake system of the present invention.

The embodiment of FIG. 1 is a schematic view of a service brake system 1 designed according to the brake-by-wire concept, wherein a control unit 2 is connected to a first brake operating device 4 by way of a signal line 3 and to a second brake operating device 6 by way of a signal line 5. The first brake operating device 4 can e.g. be a brake pedal module wherein the application of a brake pedal 7 is sensed by a sensor device 8 and converted into corresponding brake signals S1 for the actuation of the service brake system 1. The second brake operating device 6 may also include a sensor device 9 for sensing the actuation of a hand lever 10, for example, and for presetting corresponding brake signals S2. Brake signals which are predetermined by the two brake operating devices 4 and 6 are converted by the control unit 2 into corresponding nominal brake values for the actuation of the wheel brakes 11 to 14. In the specification of the nominal brake values, additional information determined by sensors (not shown), such as vehicle speed, transverse acceleration, or yaw rate, may be taken into consideration by the control unit 2 in order to achieve safety-relevant additional functions such as of an ABS, brake assist system, driving stability control, etc.

The service brake system 1 can be actuated both by the first brake operating device 4 that is configured as a brake pedal module and by the second brake operating device 6. This renders it possible to the driver to initiate a brake operation by means of the service brake with the aid of the manually operable second brake operating device 6 even upon failure of the brake pedal module.

In another embodiment, it is also possible to use a parking brake operating device as a second brake operating device for the activation of the service brake system.

Figure 2:
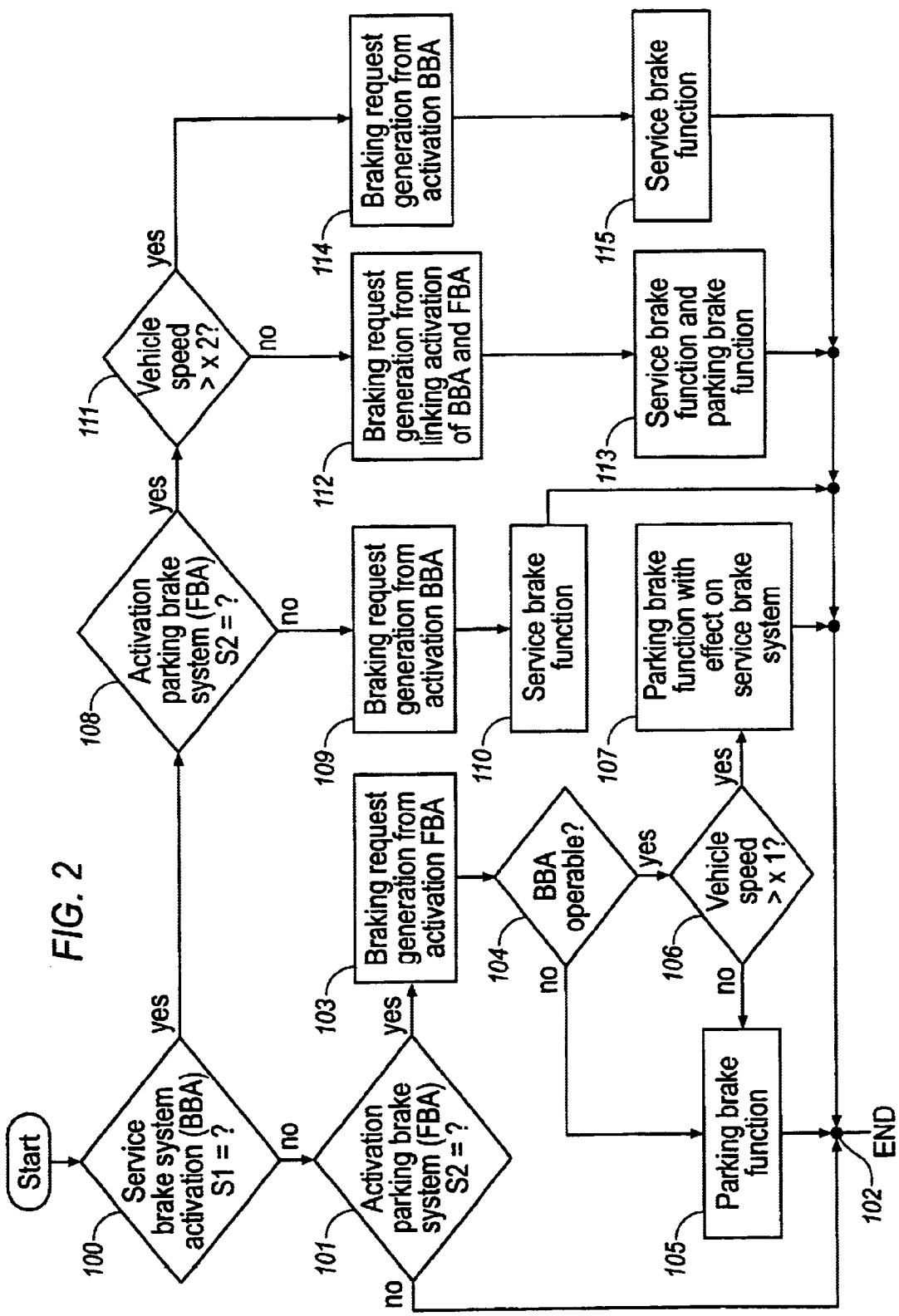
FIG. 2 is a flow chart which shows a first embodiment of a processing operation in a control unit.

FIG. 2 shows a schematic view of an embodiment for a sequence for the actuation of a brake system which is cyclically performed in a control unit, wherein the service brake is actuatable also on the basis of brake signals of a parking brake operating device.

In the sequence of operation shown in FIG. 2, a polling is performed after the start in a first step 100 as to whether a brake signal S1 is output by the service brake operating device which is e.g. configured as a brake pedal module. In the absence of a brake signal S1, a check is made in a next step 101 whether a brake signal S2 is output by the parking brake operating device. In the absence of brake signal S1 and brake signal S2, it is assumed that the driver does not request brake intervention, and the sequence is terminated at point 102.

If, however, the result of the polling in step 101 is that there is a brake signal S2 predetermined by the parking brake operating device, a nominal brake value which corresponds to the driver's request for braking is generated in step 103 based on the brake signal S2. Subsequently, a check is made in another step 104 as to whether the service brake operating device is still operable. When the service brake operating device is not functioning, the parking brake system is activated in a step 105 corresponding to the nominal brake value generated in step 103. If, however, the result of the check made in step 104 is that the service brake operating device is operable, a polling is initially performed in step 106 as to whether the vehicle speed is in excess of a predetermined threshold value x1. This threshold value may be in the range of 5 km/h or below, for example. When the vehicle speed is below the fixed threshold value, it is assumed that the driver's primary intention is to park the vehicle, and the parking brake system is activated in step 105 corresponding to the nominal brake value generated in step 103.

However, if the result of the polling in step 106 is that the vehicle speed exceeds the fixed threshold value x1, instead of the parking brake system, the service brake system is activated in a step 107 corresponding to the nominal brake value generated in step 103. This permits also the employment of the higher functions (ABS, driving dynamics control, etc.) in case of need in order to e.g. prevent locking of the wheels. In addition, it is avoided that a driver will activate the parking brake system at excessive speeds, which would greatly stress the system or even damage it.

When the driver brakes his/her vehicle by actuating the parking brake operating device, the service brake system will be activated above the speed threshold x1 and the parking brake system will be activated starting from the vehicle speed x1. This means that the driver can safely park the vehicle in standstill. In order to prevent abrupt braking during change-over from the service brake function to the parking brake function, for example, the total vehicle deceleration in the change-over point which is produced by the service brake system, may be regulated or controlled to have an amount similar to the total vehicle deceleration of the parking brake system. Instead of the total vehicle deceleration, brake forces or brake torques may also be chosen as a criterion for achieving a jerk-free transition. If, however, the speed threshold x1 is chosen to be so low that jerk-free transition which occurs will only mildly be felt by the driver, there is no need to adapt the vehicle deceleration in the change-over point.

Because the vehicle speed in the vehicle is generally known and required, for example, by various control devices as an input information, no special effort is needed to make this information available as a criterion between change-over from the service brake actuation to the parking brake actuation and vice-versa. Thus, the vehicle speed e.g. for the ABS function is calculated from the signals of wheel rotational speed sensors and is thus available. In the absence of vehicle speed information, only the parking brake will still be activated, without having effect on the service brake system.

If, on the other hand, the polling in step 100 discovers a brake signal S1 predetermined by the service brake operating device, a polling will follow in a next step 108 as to whether a brake signal S2 is also predetermined by the parking brake operating device. If this is not the case, it is assumed that the driver requests an actuation of the service brake system. Therefore, in a step 109, a nominal brake value corresponding to the driver's request for braking is generated based on the brake signal S1, and the service brake system is activated in a next step 110 corresponding to the nominal brake value generated in step 109.

However, in the event that the result of the polling in steps 100 and 108 is that brake signals S1 and S2 are predetermined by both the service brake operating device and the parking brake operating device, a check is made in a step 111 whether the vehicle speed is in excess of a threshold value x2. If this is not the case, the brake request generation will occur in a step 112 by the driver linking the service brake and parking brake actuations. Linking is effected so that the resulting value is higher than/equal to the minimum made up of both brake requests. This may be done, for example, by maximizing or averaging the two values. Subsequently, the service brake system and the parking brake system is activated in a step 113 with this resulting nominal brake value.

If, however, the result of the polling in step 111 is that the vehicle speed is higher than the threshold value x2, a nominal brake value corresponding to the driver's request for braking will be generated in a next step 114 on the basis of the brake signal S2 predetermined by the service brake operating device. Subsequently, the service brake system will be activated in a step 115 corresponding to the nominal brake value generated in step 114.

Figure 3:
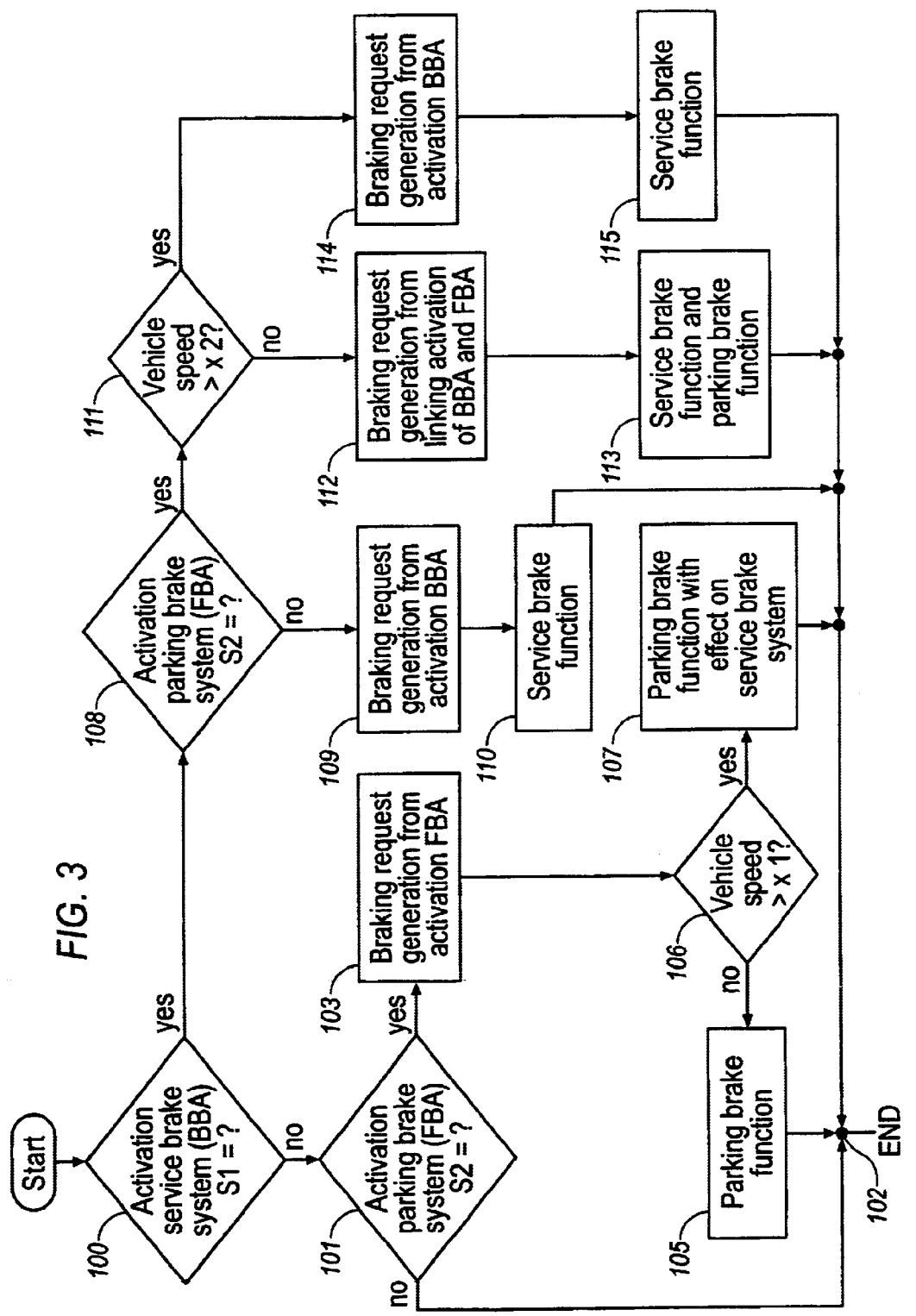
FIG. 3 is a flow chart which shows a second embodiment of a processing operation in a control unit.

The sequence illustrated in FIG. 3 generally corresponds to the sequence corresponding to FIG. 2 so that coincident steps have been assigned like reference numerals. In contrast to the embodiment according to FIG. 2, step 104 is omitted in the embodiment according to FIG. 3 for reasons of clarity. This means that the polling with respect to the operability of the service brake operating device is eliminated. Rather, step 103 is followed by the polling step 106 in which a distinction is made between the activation of the parking brake or service brake in dependence on the threshold value x1 of the vehicle speed.

In another simplified embodiment of FIG. 2 and FIG. 3, the vehicle speed threshold value x1 can be set to equal the vehicle speed threshold value x2. The procedure described with respect to FIGS. 2 and 3 may also be modified inasfar as the parking brake operating device is the first to undergo polling before the service brake operating device is polled.

Although generally the service brake operating device is actuated by foot, the actuation could also be manual. The parking brake operating device is also operable manually or by pedal.

What is claimed is:

1. Electrically operable brake system for automotive vehicles, comprising:
   a service brake system,
   a first sensor device for sensing an actuation of a first brake operating device and for generating a first brake signal,
   a parking brake system,
   a second sensor device for sensing an actuation of a second brake operating device and for generating a second brake signal, and
   means for receiving the first and second brake signals, wherein the receiving means generates a first nominal brake value based on the second brake signal when the first brake signal is not received and the second brake signal is received,
   wherein, if the service brake system is not operational, the parking brake system is activated corresponding to the first nominal brake value, and
   wherein, if the service brake system is operational, the parking brake system is activated corresponding to the first nominal brake value when a vehicle speed is less than a first predetermined threshold value, and the service brake system is activated corresponding to the first nominal brake value when the vehicle speed is greater than the first predetermined threshold value.

2. Brake system as claimed in claim 1, wherein the receiving means generates a second nominal brake value based on the first brake signal when the first brake operating signal is received and the second brake operating signal is not received, and wherein the service brake system is activated corresponding to the second nominal brake value.

3. Brake system as claimed in claim 1, wherein the receiving means generates a third nominal brake value based on the second brake signal when the vehicle speed exceeds a second predetermined threshold value, and wherein the service brake system is activated corresponding to the third nominal brake value.

4. Brake system as claimed in claim 3, wherein the receiving means generates a braking request based on one of a maximum and an average of the first and second brake signals when the vehicle speed does not exceed the second predetermined threshold value, and wherein both the service brake system and parking brake system are activated corresponding to the braking request.

5. Brake system as claimed in claim 1, further including a monitoring device for testing an operability of the first and second brake operating devices.

6. Electrically operable brake system for automotive vehicles, comprising:
   a service brake system,
   a first sensor device for sensing an actuation of a first brake operating device and for generating a first brake signal,
   a parking brake system,
   a second sensor device for sensing an actuation of a second brake operating device and for generating a second brake signal, and means for receiving the first and second brake signals, wherein the receiving
   means generates a first nominal brake value based on the second brake signal when the first brake signal is not received and the second brake signal is received,
   wherein the parking brake system is activated corresponding to the first nominal brake value when a vehicle speed is less than a first predetermined threshold value, and the service brake system is activated corresponding to the first nominal brake value when the vehicle speed is greater than the first predetermined threshold value.

7. Brake system as claimed in claim 6, wherein the receiving means generates a second nominal brake value based on the first brake signal when the first brake operating signal is received and the second brake operating signal is not received, and wherein the service brake system is activated corresponding to the second nominal brake value.

8. Brake system as claimed in claim 6, wherein the receiving means generates a third nominal brake value based on the second brake signal when the vehicle speed exceeds a second predetermined threshold value, and wherein the service brake system is activated corresponding to the third nominal brake value.

9. Brake system as claimed in claim 8, wherein the receiving means generates a braking request based on one of a maximum and an average of the first and second brake signals when the vehicle speed does not exceed the second predetermined threshold value, and wherein both the service brake system and parking brake system are activated corresponding to the braking request.

10. Brake system as claimed in claim 6, further including a monitoring device for testing an operability of the first and second brake operating devices.

11. Brake system for automotive vehicles, comprising:

a service brake system, a first sensor device for sensing an actuation of a brake pedal and for generating a first brake signal, a parking brake system, a second sensor device for sensing an actuation of a manually-operated parking brake device and for generating a second brake signal, and at least one control unit for generating a first nominal brake value based on the second brake signal when the first brake signal is not received and the second brake signal is received, wherein, if the service brake system is not operational, the parking brake system is activated corresponding to the first nominal brake value, and wherein, if the service brake system is operational, the parking brake system is activated corresponding to the first nominal brake value when a vehicle speed is less than a first predetermined threshold value, and the service brake system is activated corresponding to the first nominal brake value when the vehicle speed is greater than the first predetermined threshold value.

12. Brake system as claimed in claim 11, wherein the receiving means generates a second nominal brake value based on the first brake signal when the first brake signal is received and the second brake signal is not received, and wherein the service brake system is activated corresponding to the second nominal brake value.

13. Brake system as claimed in claim 11, wherein the receiving means generates a third nominal brake value based on the second brake signal when the vehicle speed exceeds a second predetermined threshold value, and wherein the service brake system is activated corresponding to the third nominal brake value.

14. Brake system as claimed in claim 13, wherein the receiving means generates a braking request based on one of a maximum and an average of the first and second brake signals when the vehicle speed does not exceed the second predetermined threshold value, and wherein both the service brake system and the parking brake system are activated corresponding to the braking request.

15. Brake system as claimed in claim 11, further including a monitoring device for testing an operability of the brake pedal and the manually-operated parking brake device.

16. Brake system for automotive vehicles, comprising:

a service brake system, a first sensor device for sensing an actuation of a brake pedal and for generating a first brake signal, a parking brake system, a second sensor device for sensing an actuation of a manually-operated parking brake device and for generating a second brake signal, and at least one control unit for generating a first nominal brake value based on the second brake signal when the first brake signal is not received and the second brake signal is received, wherein the parking brake system is activated corresponding to the first nominal brake value when a vehicle speed is less than a first predetermined threshold value, and wherein the service brake system is activated corresponding to the first nominal brake value when the vehicle speed is greater than the first predetermined threshold value.

17. Brake system as claimed in claim 16, wherein the receiving means generates a second nominal brake value based on the first brake signal when the first brake signal is received and the second brake signal is not received, and wherein the service brake system is activated corresponding to the second nominal brake value.

18. Brake system as claimed in claim 16, wherein the receiving means generates a third nominal brake value based on the second brake signal when the vehicle speed exceeds a second predetermined threshold value, and wherein the service brake system is activated corresponding to the third nominal brake value.

19. Brake system as claimed in claim 18 wherein the receiving means generates a braking request based on one of a maximum and an average of the first and second brake signals when the vehicle speed does not exceed the second predetermined threshold value, and wherein both the service brake system and the parking brake system are activated corresponding to the braking request.

20. Brake system as claimed in claim 16, further including a monitoring device for testing an operability of the brake pedal and the manually-operated parking brake device.

* * * * *